(12) United States Patent
Black et al.

(10) Patent No.: US 8,917,792 B2
(45) Date of Patent: Dec. 23, 2014

(54) METHOD AND APPARATUS FOR THE CANCELLATION OF INTERMODULATION AND HARMONIC DISTORTION IN A BASEBAND RECEIVER

(71) Applicant: Motorola Mobility LLC, Libertyville, IL (US)

(72) Inventors: Gregory R. Black, Vernon Hills, IL (US); Dale G. Schwent, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 23 days.

(21) Appl. No.: 13/711,734

(22) Filed: Dec. 12, 2012

(65) Prior Publication Data

US 2014/0161159 A1 Jun. 12, 2014

(51) Int. Cl.
*H04B 15/00* (2006.01)
*H04B 1/04* (2006.01)
*H04B 1/10* (2006.01)
*H04B 1/12* (2006.01)
*H04B 1/52* (2006.01)

(52) U.S. Cl.
CPC .............. *H04B 1/0475* (2013.01); *H04B 15/00* (2013.01); *H04B 1/109* (2013.01); *H04B 1/123* (2013.01); *H04B 1/525* (2013.01)
USPC ........... 375/285; 375/259; 375/346; 455/295; 455/296

(58) Field of Classification Search
CPC ........ H04B 15/00; H04B 15/02; H04B 1/525; H04B 1/10
USPC ........... 375/259, 285, 346; 455/254, 295–296
See application file for complete search history.

(56) References Cited

U.S. PATENT DOCUMENTS

| 5,237,332 | A | 8/1993 | Estrick et al. |
| 5,801,595 | A * | 9/1998 | Davis et al. .................... 332/170 |
| 6,496,064 | B2 * | 12/2002 | Rzyski .......................... 330/149 |
| 7,876,867 | B2 | 1/2011 | Filipovic et al. |
| 8,320,868 | B2 * | 11/2012 | Pratt et al. ...................... 455/296 |
| 8,588,711 | B2 * | 11/2013 | Ishikawa et al. ............ 455/114.3 |
| 2004/0048576 | A1 | 3/2004 | Hildebrand et al. |
| 2006/0105723 | A1 * | 5/2006 | Anvari ........................ 455/114.2 |

(Continued)

FOREIGN PATENT DOCUMENTS

WO 2009090400 A1 7/2009

OTHER PUBLICATIONS

Patent Cooperation Treaty, International Search Report and Written Opinion of the International Searching Authority for International Application No. PCT/US2013/071824, Apr. 14, 2014, 11 pages.

*Primary Examiner* — Jean B Corrielus
(74) *Attorney, Agent, or Firm* — Leydig, Voit & Mayer, Ltd.

(57) ABSTRACT

A method (600) and apparatus (200) cancel odd-order distortion signals. Desensitization can be determined (610) in a received signal caused by odd-order harmonic distortion occurring from at least one transmit signal. A baseband replica harmonic distortion signal can be generated (620) using the transmit signal. The baseband replica harmonic distortion signal can be converted (630) to a low frequency harmonic distortion signal. The low frequency harmonic distortion signal can be subtracted (640) from the received signal to cancel the odd-order distortion from the received signal to create a corrected signal.

30 Claims, 5 Drawing Sheets

(56) References Cited

U.S. PATENT DOCUMENTS

| | | |
|---|---|---|
| 2007/0184782 A1 | 8/2007 | Sahota et al. |
| 2008/0232268 A1* | 9/2008 | Kahrizi et al. .................. 370/252 |
| 2010/0271987 A1* | 10/2010 | Chiu et al. ..................... 370/278 |
| 2011/0075754 A1 | 3/2011 | Smith |
| 2011/0299575 A1* | 12/2011 | Aoulad Ali et al. ............ 375/219 |
| 2012/0140860 A1 | 6/2012 | Rimini et al. |
| 2013/0044791 A1* | 2/2013 | Rimini et al. .................. 375/219 |
| 2014/0011464 A1* | 1/2014 | Anderson et al. ................ 455/78 |
| 2014/0036736 A1* | 2/2014 | Wyville ......................... 370/278 |

* cited by examiner

METHOD AND APPARATUS FOR THE CANCELLATION OF INTERMODULATION AND HARMONIC DISTORTION IN A BASEBAND RECEIVER

FIELD OF THE INVENTION

The present invention relates generally to wireless communication and, in particular, to improving performance of devices transmitting multiple signals by cancelling intermodulation distortion signals in a baseband receiver.

BACKGROUND

Presently, wireless communication devices are being configured with multiple transmitters and receivers. A wireless communication device can transmit multiple signals simultaneously, but doing so causes multiple order intermodulation distortion to the signals received by the device. With multiple receivers operating simultaneously, there can be desensitization if a receive channel frequency is on a harmonic frequency of a single transmitter or on an intermodulation frequency of multiple transmitters. In order to reduce the desensitization caused by transmitters, the devices often impose the front end components of the device to have high linearity. As devices increase on complexity and the number of transmitters and receivers increase, it is challenging to configure existing front end components such as radio frequency switches, power amplifiers and duplex filters, with sufficient linearity.

Certain wireless communication devices are required to perform simultaneous transmissions for different radio access networks and modes. In these products, the intermodulation distortion signal generated from the at least two transmit signals can fall within the receive band of the received signal causing receiver desensitizing interference. In certain cases, this distortion can be odd-order, e.g. $3^{rd}$ and $5^{th}$ order, intermodulation in the receive bands. Also, in the case of a single transmitter and multiple receivers, it is possible that a transmitter harmonic distortion falls into a receive band. The problem of harmonic or intermodulation distortion causing receiver desensitization may continue to exist as the market adopts new features as accepted by 3GPP and other standards that use multiple carriers.

In the past, a solution to the harmonic or intermodulation distortion was to reduce transmitter power. For the case of $3^{rd}$ order distortion, the interference is reduced 3 dB for every 1 dB of transmitter power. Unfortunately, the reduced power reduces uplink performance. Another solution is to isolate the circuits that are carrying the transmit signals in the device. One way to achieve this is to use a single antenna and combine the transmit signals with a diplexer having sufficient isolation. Alternatively, the signals can be isolated by using separate antennas with sufficient isolation between them. Another solution could also employ both separate antennas and diplexing circuits. Unfortunately, these approaches require large and costly additional Radio-Frequency (RF) components and do not provide sufficient isolation to fully eliminate receiver desensitization. RF cancellation methods have also been proposed. Unfortunately, these cancellation methods require additional front end components that increase the cost, size and power dissipation of the devices.

Another method is to cancel the intermodulation distortion in the receiver baseband. In one such endeavor, a baseband cancellation method separates the interfering signal from the receive signal in order to generate a replica intermodulation distortion signal. This is done by extracting the distortion signal from the actual received signal. Unfortunately, the extraction of interference from the received signal requires additional calibration hardware and software. One can also generate baseband intermodulation distortion signals directly from the baseband transmitter. In the past this method has been applied to cases where there is a single transmit signal with second order intermodulation distortion causing an intermodulation signal at baseband. Unfortunately, this method does not work for multiple transmit signals because it does not address the problem of intermodulation distortion occurring at non-direct current (DC) baseband frequency, such as at a correct low intermediate frequency.

In view of the foregoing, there is a need to address higher order harmonic and intermodulation distortion which occur on a received signal frequencies, caused by one or more transmitters.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the cancellation of intermodulation distortion in a baseband receiver. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of cancellation of intermodulation distortion in a baseband receiver described herein. The non-processor circuits may include, but are not limited to, a radio receiver, a radio transmitter, signal drivers, clock circuits, power source circuits, and user input devices. As such, these functions may be interpreted as steps of a method to perform cancellation of intermodulation distortion in a baseband receiver. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A method and apparatus for cancelling intermodulation or harmonic distortion signals in the baseband receiver is disclosed. The disclosed method can include determining desensitization that can occur in a receiver caused by intermodulation or harmonic distortion occurring from one or more transmit signals. The desensitization can be determined by determining that the transmit frequencies are such that intermodulation or harmonic distortion can occur on a receive frequency. In addition, the method can include generating a baseband replica distortion signal using the baseband transmit signals, and converting the baseband replica distortion signal to a low frequency replica distortion signal, having a frequency which is the same as the down-converted distortion signal in the baseband receiver, to create a cancelling signal used to cancel the odd-order intermodulation or harmonic distortion from the baseband received signal. Moreover, the method can include subtracting the low frequency replica distortion signal, i.e. the cancelling signal, from the baseband received signal to form a corrected signal. In an embodiment, the method can include filtering the low frequency replica distortion signal using a baseband filter, wherein the baseband filter has a transfer function similar to a baseband filter of a receiver receiving the received signal, to form the cancelling signal.

In another embodiment, the distortion signals can include upper order and lower order distortion signals and wherein the upper order and lower order distortion signals are determined based on the frequencies of the transmit signals. The upper order frequency of the intermodulation distortion signals can be determined by adding a negative multiple of a lower frequency of the transmit signals to a positive multiple of the higher frequency of the transmit signals, and a lower order frequency of the intermodulation distortion signal can be determined by adding a negative multiple of a lower frequency of the transmit signals to a negative multiple of a higher frequency of the transmit signals.

In an embodiment, generating a baseband replica distortion signal can include sampling the transmit signals near the Nyquist limit of the transmit signals to avoid aliasing wherein the sampling being performed prior to calculating the distortion signals. Moreover, the method can include using interpolated complex signals to generate the baseband replica distortion signals. In addition, complex multiplication of the transmit signals can be used to generate the baseband replica distortion signals. Frequency separation of the transmit signals can also be used to generate the baseband replica distortion signals. In the disclosed method, generating the baseband replica intermodulation distortion signal can include determining a lower order demodulation signal using a function of the upper frequency signal multiplied by a function of the lower frequency signal and determining an upper order demodulation signal using a function of the lower frequency signal multiplied by a function of the upper frequency signal. Generating the baseband replica harmonic distortion signal can include determining the signal using a function providing a sum of algebraic power of the transmit signals. For example, this can include the algebraic power or the sum of algebraic powers. The sum of algebraic powers can be used by compensating for more than one harmonic. In this case, the intermodulation distortion above the harmonic can allow for compensating for more than one intermodulation product. For example, a sum of multiple functions of the upper frequency signal can be multiplied by a function of the lower frequency signal. For example, $f(S1) \cdot g(S2) + x(S1) \cdot y(S2) + \ldots$ The method can also include scaling the generated replica distortion signals according to an expected distortion level using a function of a power level of the transmit signals and a gain of a receiver. The method can also include delaying the generated replica intermodulation distortion signals by an amount using a function of the correlation between the generated replica signal and the input signal. The resolution of the delay may be a fraction of the sample rate of the input signal, implemented via an oversampling of the input signal or via a complex multiplication in the frequency domain. In addition, the method can include complex multiplication on the baseband distortion signal and a clock signal having a frequency of the downconverted distortion signal. The complex multiplication can convert a Direct Current (DC) baseband replica distortion signal to a low frequency replica distortion signal having frequency of the clock signal frequency. The clock signal frequency can be determined calculating difference between the local oscillator frequency, $F_{LO}$, employed in the receiver and the odd order distortion frequency.

The disclosed apparatus includes a receiver and at least two transmitters. The transmitters can cause odd-order desensitization of a signal received by the receiver. A second apparatus can include a transmitter and at least two receivers where the transmitter can cause harmonic desensitization of a signal received by one of the receivers. In addition, the disclosed apparatus can include an adaptive baseband distortion canceller coupled between the receiver and the transmitters wherein the adaptive baseband distortion canceller generates a baseband replica intermodulation distortion signal or baseband replica harmonic distortion signal using transmit signals to be sent by the transmitter, converts the baseband replica signal to a low frequency distortion signal, and subtracts the low frequency distortion signal from the received signal to create a corrected signal.

The adaptive baseband distortion canceller can include a complex digital mixer for performing complex multiplication on the baseband replica distortion signal to generate a cancelling signal at the same intermediate frequency as the downconverted distortion signal. The complex digital mixer converts the frequency of the replica signal using a difference of the frequencies in the transmit signals. The complex digital mixer has an input of the difference between a frequency of a local oscillator and a frequency of the odd order distortion signal. The adaptive baseband distortion canceller can also include a baseband distortion calculator and a least mean squared adaptive filter or correlation calculator to provide a desired signal amplitude and phase of the cancelling signal.

Figure 1:
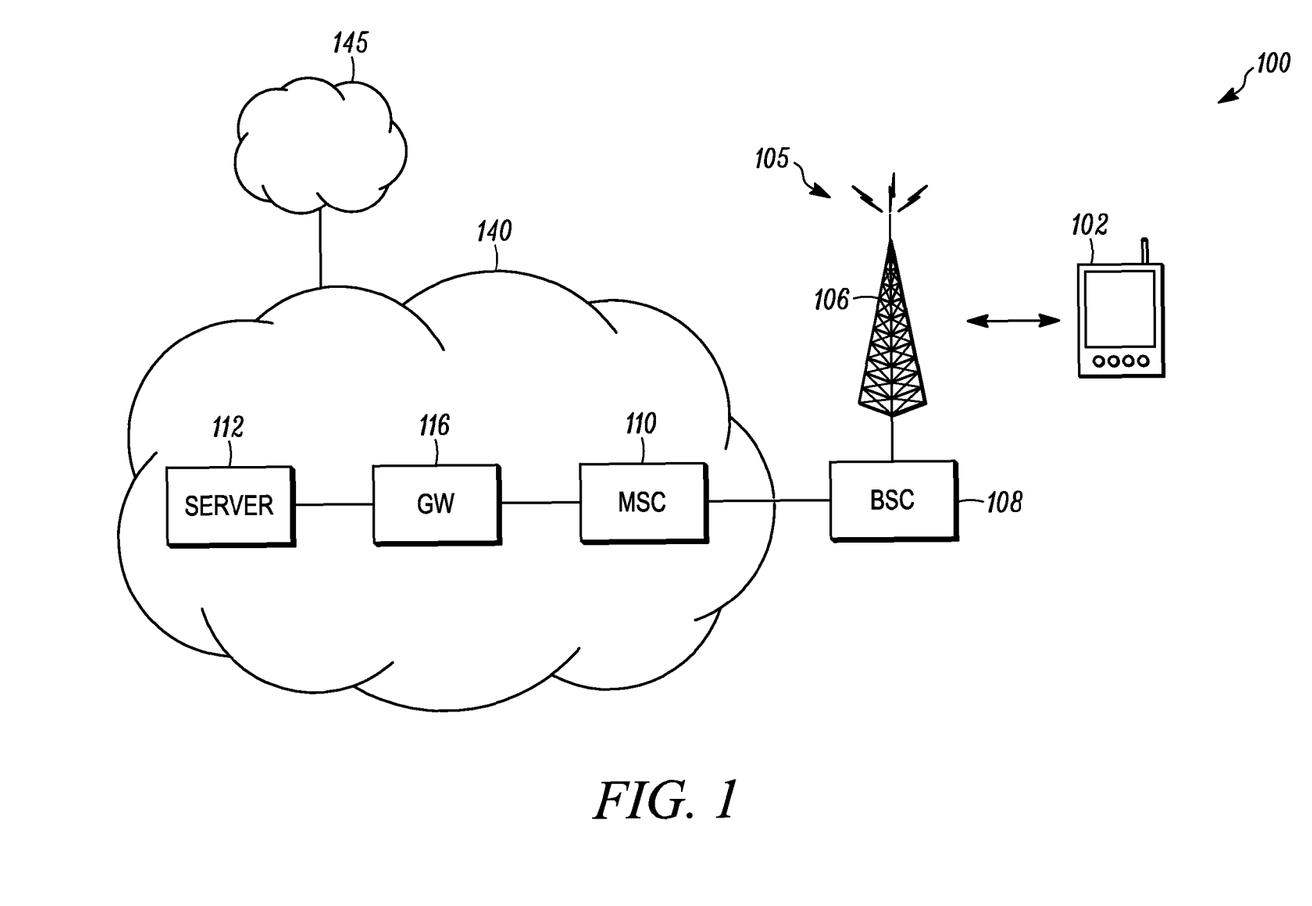
FIG. 1 is an example block diagram of a wireless communications network according to a possible embodiment.

FIG. 1 is an example block diagram of a Wireless Communications Network (WCN) 100 according to a possible embodiment, within which certain of the functional aspects of the described embodiments may be implemented. WCN 100 can be any of the known or developed wireless communications networks including Code Division Multiple Access (CDMA), Time Division Multiple Access (TDMA), Global System of Mobile Communications (GSM), Orthogonal Frequency Division Multiplex (OFDM) networks and further generations of such networks include 2.5, $3^{rd}$ and $4^{th}$ Generation Partnership Project (GPP) and Long Term Evolution (LTE) networks as well as hybrid or combined network that supports these and other wireless communication protocols. WCN 100 can be any of these wireless communications network in which at least one Wireless Communication Device (WCD) 102 operates with a channel between the WCD serving as a client and a server 112 accessible through the WCN 100 and the Internet 145 WCN 100 utilizes standard signaling to enable communication of specific messages and data between network components, such as a Mobile Switching Center (MSC) 110 and a gateway 116, that are a part of WCN infrastructure 140.

The WCN 100 includes wireless communications device (WCD) 102, which can be a mobile device, mobile station, a cell phone, a smartphone, or any other wireless enabled device. In one embodiment, WCD 102 is a subscriber device to WCN 100 and wirelessly connects to the infrastructure of WCN 100 via base station (BS) 105, which comprises base station antenna 106 and a base station controller 108. Base station antenna 106 provides an access point to WCN 100 for WCD 102. In addition to the base station components 106 and 108, the infrastructure of WCN 100 comprises the MSC 110, which is connected to BSC 108 as well as to a backbone of interconnected functional servers (not shown) of WCN 100. As shown, MSC 110 connects to and communicates with several other known network components (not shown) and with gateway 116. BSC 108, MSC 110 and other servers in a network 140 operate according to any of the mentioned protocols. As is understood, WCD 102 is able to connect to services provided by server 112 as well as connect to other WCD and other telecommunication equipment through the network 140 and other networks 145.

Figure 2:
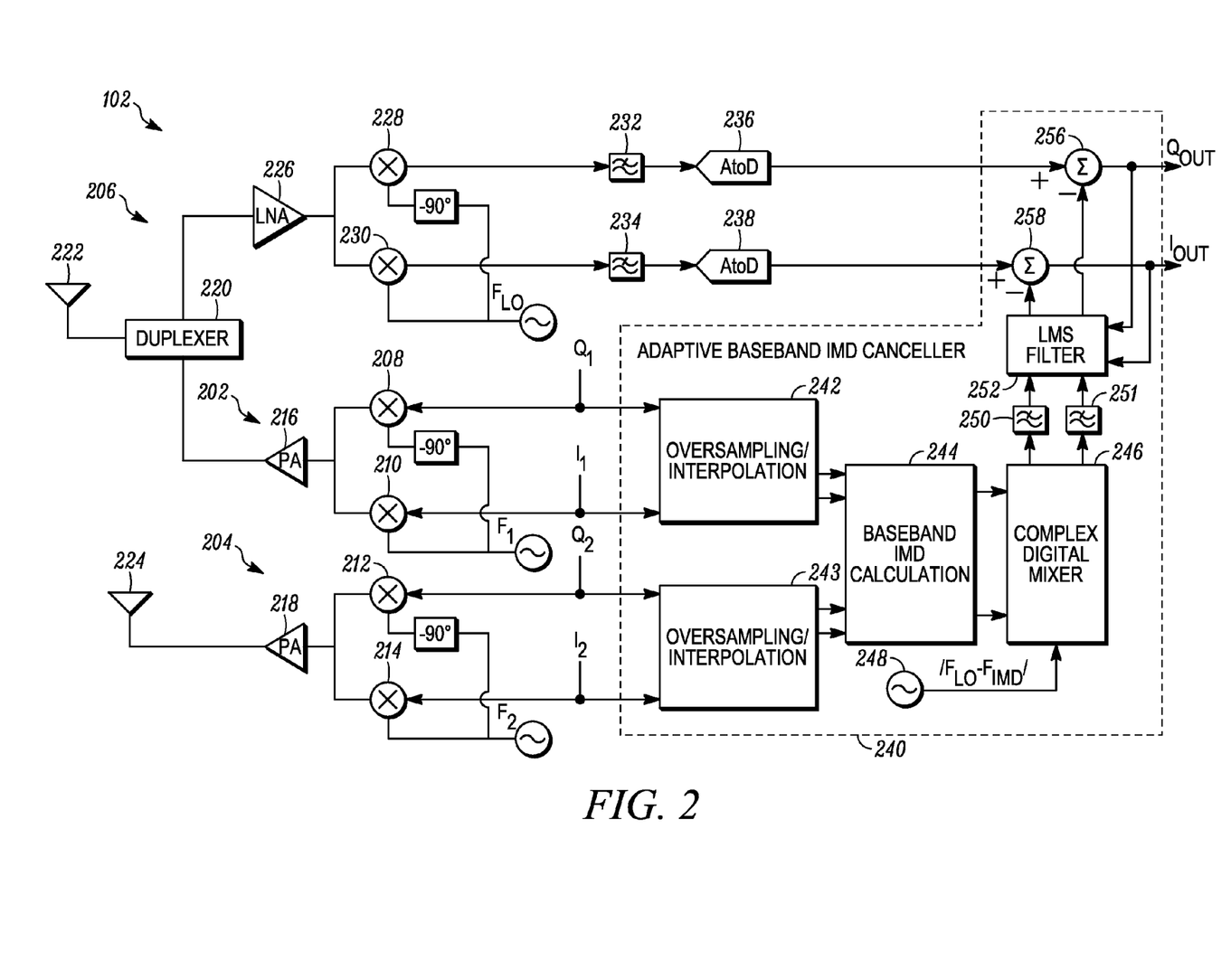
FIG. 2 is an example block diagram of a wireless communication device according to a possible embodiment.

FIG. 2 is an example block diagram of a WCD 102 according to a possible embodiment. The WCD can include least two transmitters 202, 204 and a receiver 206. Intermodulation or harmonic distortion can be caused on the receiver 206 by the transmitters 202, 204 as well as other front end components of the WCD 102. Each transmitter 202, 204 sends a transmit signal from the WCD 102 on the uplink channels between the WCD 102 and the base station 106. The transmit signals each are comprised of a number of different channels that are combined into one and sampled using a filter. The filter signals are modulated and amplified before being transmitted through at least one antenna 222, 224 over the uplink channel at given frequencies according to the protocol allocations of the WCN 100. For the receiver 206 of the WCD 102, intermodulation distortion can be introduced from the various components of the WCD 102 included the transmitters 202, 204. Harmonic distortion can be introduced from the various components of the WCD 102 including at least one of the transmitters 202, 204. As there are two transmitters, the multiple transmit signals can cause upper order demodulation including odd-order intermodulation distortion to the received signal. In addition, a single one of the two transmitters 202, 204 can cause harmonic distortion to the received signal.

Source signals $S_1$ and $S_2$ are fed into the transmit path of the WCD 102. The source signals $S_1$ and $S_2$ are both complex signals and are shown in terms of each of their I component and Q component such that $S_1=I_1+jQ_1$ and $S_2=I_2+jQ_2$. In an embodiment, the source signals $S_1$ and $S_2$ are filtered by various filters (not shown) so as to limit the bandwidth and help limit spurious emissions. The filters source signals can be input to a sampler (not shown) that increases the sampling rate of the baseband to provide a higher sampling rate for input to the mixers 208, 210, 212, 214. The mixers 208-214 modulate the source signals with the RF carrier to provide modulated RF output signal, which is then input to a power amplifier 216, 218. As seen, the Q component of each signal $S_1$ and $S_2$ are phase shifted by mixer 208, 212. In addition, the I component of each signal $S_1$ and $S_2$ are upconverted with designated local oscillator frequency $F_1$ and $F_2$ of the transmitter 202, 204 by the mixer 210, 214. The power amplifier 216, 218 is controlled by a transmission gain control signal to apply a suitable gain to the modulation RF signal for transmission. One of the modulated RF signals is input to duplexer 220 for feeding to antenna 222 for transmission from the WCD 102. The other modulated RF signal is input directly to antenna 224 for transmission from the WCD 102.

With respect to the receiver path, antenna 222 receives modulated RF signals, which are fed via duplexer 220 in the receiver 206. The received signals are first amplified by a Low Noise Amplifier (LNA) 226. From the LNA 226, the I and Q components of the signal are fed to mixers 228, 230 for demodulation from the RF to baseband. Mixer 228 phase shifts the signal Q component. For the I component, the mixer 230 combines the received signal with a local oscillator signal have a frequency $F_{LO}$. In an embodiment, the obtained demodulated signals are input to a receiver amplifier (not shown,) which can be controlled by a gain control signal in order to amplify the received signal by a necessary gain. The amplified and demodulated received signal is then input to an anti-alias filter 232, 234 to restrict the bandwidth of the signal prior to be down sampled. The filtered received signal is then input to an Analog-to-Digital (A/D) converter 236, 238 that produces a baseband signal at an oversampled rate for processing by the remainder of the receiver 206.

As seen, the transmitter 202 and receiver 206 share the duplexer 220 in order to be able to feed signals to and receive signals from the antenna 222. In addition, there is the separate antenna 224. In some systems where both the transmitter 202 and receiver 206 are simultaneously active and with the addition of the separate antenna 224 and transmitter 204, the problem of desensitization between the transmitters 202, 204 and the receiver 206 can occur. In some systems where both the transmitter 204 and receiver 206 are simultaneously active, odd-order harmonics of the transmitter 204 can cause the problem of desensitization between the transmitter 204 and the receiver 206. Moreover, the combination of multiple transmitters with the receiver as described can also cause distortion including odd-order intermodulation distortion.

In order to overcome the odd-order intermodulation or harmonic distortion caused by the design described above, the WCD 102 includes an adaptive baseband distortion canceller 240. The canceller 240 can generate a baseband replica distortion signal that can be provided to the received signal and used to cancel the odd-order distortion caused by the transmitter to the received signal.

Receiver desensitization can occur if the intermodulation distortion signal frequency $F_{IMD}$ occurs in the band of the desired receive signal. As is understood, $S_1$ and $S_2$ each can have different frequency $F_1$ and $F_2$, respectively. The third and fifth order intermodulation distortion signals can be depicted spectrally as shown in the spectral illustration 300 in FIG. 3. A third order lower distortion signal $S_{3L}$ can be at the frequency $F_{3L}=2*F_1-F_2$ and a third order upper distortion signal $S_{3U}$ can be at the frequency $F_{3U}=2*F_2-F_1$. Likewise, fifth order lower distortion signal $S_{5L}$, can be at the frequency $F_{3L}=3*F_1-2*F_2$ and a fifth order upper distortion signal $S_{5U}$ can be at the frequency $F_{3U}=3*F_2-2*F_1$. More generally, for m odd-order distortion, a m order lower distortion signal $S_{mL}$ can be at the frequency $F_{mL}=n*F_1+pF_2$, and a m order upper distortion signal $S_{mU}$ can be at the frequency $F_{mU}=n*F_2+pF_1$, where n=m/2 rounded up to the nearest integer, where p is negative, and where p=m/2 rounded down to the nearest integer.

One part of the generating the baseband replica distortion signal can include signal bandwidth and aliasing. In general, the transmit signals $S_1$ and $S_2$ are available at the transmitters 202, 204 at a sample rate that is near the Nyquist limit. According to modulation theory, a signal bandwidth of an $m^{th}$ order product signal is m times the bandwidth of the constituent signals, $S_1$ and $S_2$. To avoid aliasing in the output signal, the canceller 240 can be configured between the transmitters 202, 204, and the receiver 206. A plurality of interpolation blocks 242, 243 can be provided where each interpolation block can connect to a transmitter 202, 204. The interpolation blocks 242, 243 can each receive input signals S=I+jQ and can oversample the signals to generate sample rate versions of the signals $S_1$ and $S_2$ prior to calculating the intermodulation distortion. Thus, the interpolated signals to be used for generating the baseband replica signal can take the same form of $S_1$ and $S_2$, S=I+jQ, albeit at a higher sample rate.

Figure 3:
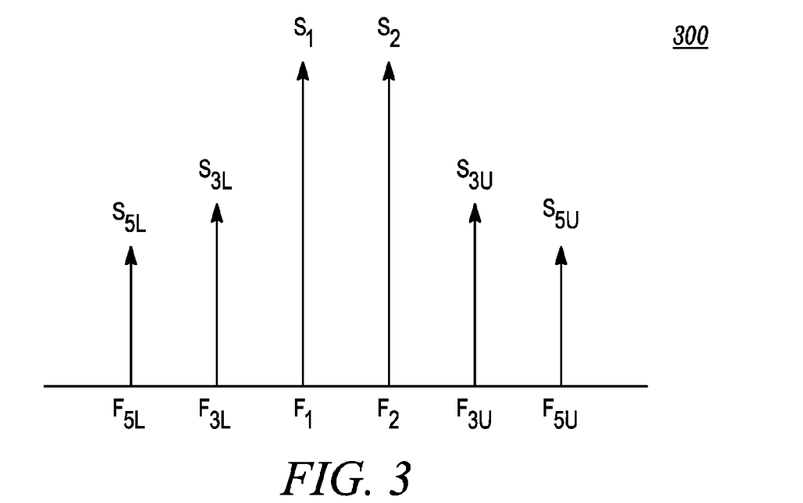
FIG. 3 is an example spectral illustration according to a possible embodiment.

The interpolation blocks 242, 243 are each coupled to the baseband distortion calculation block 244. The calculation block 244 can calculate the baseband distortion signal using complex arithmetic on the transmit interpolated baseband signals received from interpolation blocks 242, 243. Referring back to FIG. 3, the $m^{th}$ order intermodulation products are calculated as:

$$S_{3L}=(S_1)^2 \cdot (S_2)^*,$$

$$S_{3U}=(S_2)^2 \cdot (S_1)^*,$$

$$S_{5L}=(S_1)^3 \cdot (S_2)^{2*}, \text{ and}$$

$$S_{5U}=(S_2)^3 \cdot (S_1)^{2*},$$

where "*" indicates a complex conjugate. For odd order intermodulation to occur in the receive band the order, m, of the intermodulation is equal to the sum of the absolute values of component orders, n and p: m=/n/+/p/, where n is positive and p is negative. Then, the $m^{th}$ order intermodulation product is calculated by calculating the $m^{th}$ power of the first signal, and multiplying by the conjugate of the $p^{th}$ power of the second signal. In general:

$$S_{mL}=(S_1)^n \cdot (S_2)^{p*}$$

The calculated signal is scaled according to the expected distortion level, which can be a function of the power level of the transmit signals and the gain of the receiver.

Calculation block 244 can be coupled to a complex digital mixer 246. The mixer 246 can receive the baseband replica distortion signal from the calculation block 244. In the situation where the replica signal is centered at Direct Current (DC), the actual distortion signal, which is intended to be cancelled, may be at a low Intermediate Frequency (IF) signal frequency. In this situation, it may be necessary to convert the frequency of the replica signal to the actual distortion low IF frequency. This can be achieved by using the mixer 246. The digital mixer 246 can operate using complex multiplication on the baseband distortion signal and a clock signal 248 that has a frequency of the desired IF frequency. The desired IF frequency can be calculated as the difference between the distortion signal frequency $F_{IMD}$ or $F_H$ and the receiver local oscillator frequency $F_{LO}$.

The output of the mixer 246 can be supplied to filters 250, 251 that can be pulse shaping and anti-aliasing filters. Thus, the replica signal that is output from the mixer 246 can have a limited bandwidth with limited spurious emissions. The filtered signal is then input into a least mean squared (LMS) adaptive filter 252 or correlation block. In addition to the filtered signal, the LMS adaptive filter 252 or correlation block can have the output of the receiver 206 as inputs. The LMS adaptive filter 252 or correlation block can adapt the amplitude and the phase of the replica distortion signal in order to cancel the actual distortion signal in the base band receiver. The output of the LMS filter 252 or correlation block is a canceller signal that is applied to the receiver.

In the baseband receiver 206, the previously referenced analog baseband filter 232, 234 is used on each I and Q component of the baseband received signal. This filtering is used to prevent aliasing by rejecting signal components above the Nyquist frequency of the previously referenced A/D converters 236, 238. The high frequency components of the actual intermodulation signal may be attenuated by the filter 232, 234. Thus, to generate an accurate replica intermodulation signal, the replica low IF distortion signal can be filtered by a low pass filter having the same transfer function as the low pass filter in the baseband receiver, as described above.

The canceller signal, which is the output of the LMS filter or correlation block, is subtracted from the processed received signal using adders 256, 258. The result of this is a received signal where there odd-order distortion signals caused by the transmitters 202, 204, are removed.

Figure 4:
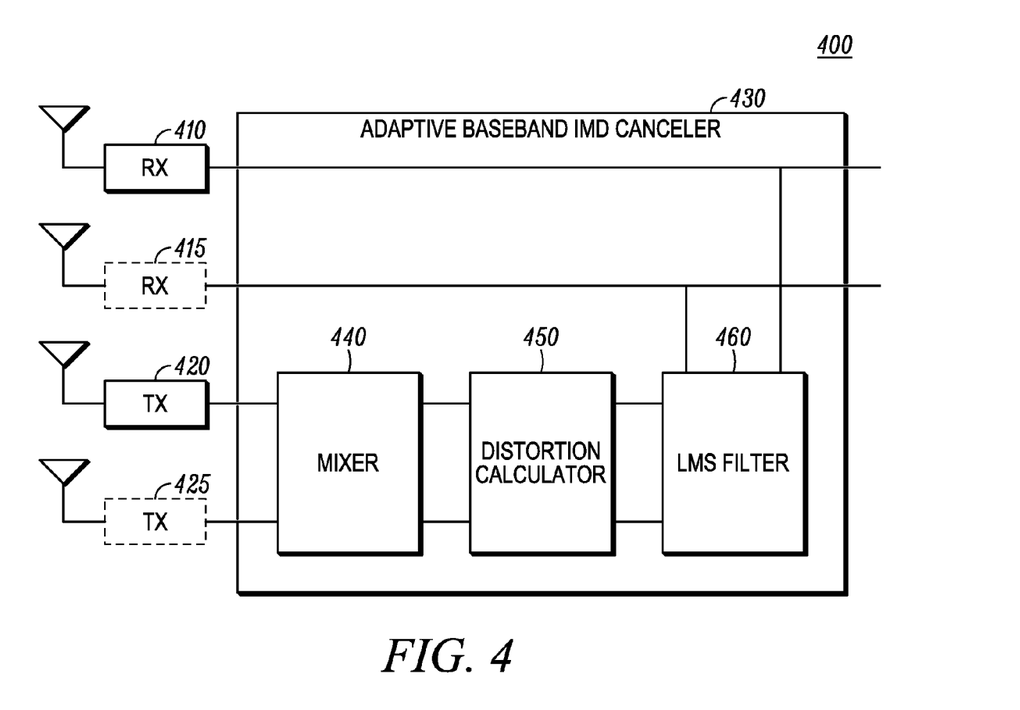
FIG. 4 is an example block diagram of a wireless communication device according to a possible embodiment.

FIG. 4 is an example block diagram of a WCD 400, such as the WCD 102, according to a possible embodiment. The WCD 400 can include a first receiver 410 that receives a received signal. The WCD 400 can include a first transmitter 420 that sends transmit signals, where the first transmitter 420 can cause odd-order distortion of the received signal. The WCD 400 can include an adaptive baseband distortion canceller 430 coupled between the receiver and the transmitter. The adaptive baseband distortion canceller 430 can operate similarly to the adaptive baseband distortion canceller 240 of FIG. 2. For example, the adaptive baseband distortion canceller 430 can generate a baseband replica distortion signal using transmit signals to be sent by the first transmitter 420, can convert the baseband replica distortion signal to a low frequency distortion signal, to create a cancellation signal, and can subtract the cancellation signal from the received signal to create a corrected signal having cancelled, or substantially attenuated, odd-order distortion.

The adaptive baseband distortion canceller 430 can include a complex digital mixer 440 that can perform complex multiplication on the baseband replica distortion signal using a difference of the frequencies in the transmit signals. The complex digital mixer has an input (shown in FIG. 2) of the difference between a frequency of a local oscillator and a frequency of baseband replica distortion signal. The adaptive intermodulation distortion canceller 430 can include a baseband distortion calculator 450. The adaptive baseband distortion canceller 430 can include at least one of a least mean squared adaptive filter and correlation block 460 to provide a desired signal amplitude and phase of the cancelling signal.

According to a related embodiment, the first transmitter 420 can send first transmit signals. The WCD 400 can optionally include a second transmitter 425 that sends second transmit signals. Transmitting both the first transmit signals and the second transmit signals causes odd-order distortion of the received signal.

According to a related embodiment, the WCD 400 can optionally include a second receiver 415. The first transmitter 420 can cause odd-order distortion of the received signal by causing desensitization of a receive channel frequency when transmitting on a frequency related to a frequency of the received signal. The frequency related to a frequency of the received signal can be a harmonic frequency of a frequency of the first transmitted signal. The frequency related to a frequency of the received signal can also be an intermodulation frequency of a frequency of the first transmit signals and a frequency of the second transmit signals.

Figure 5:
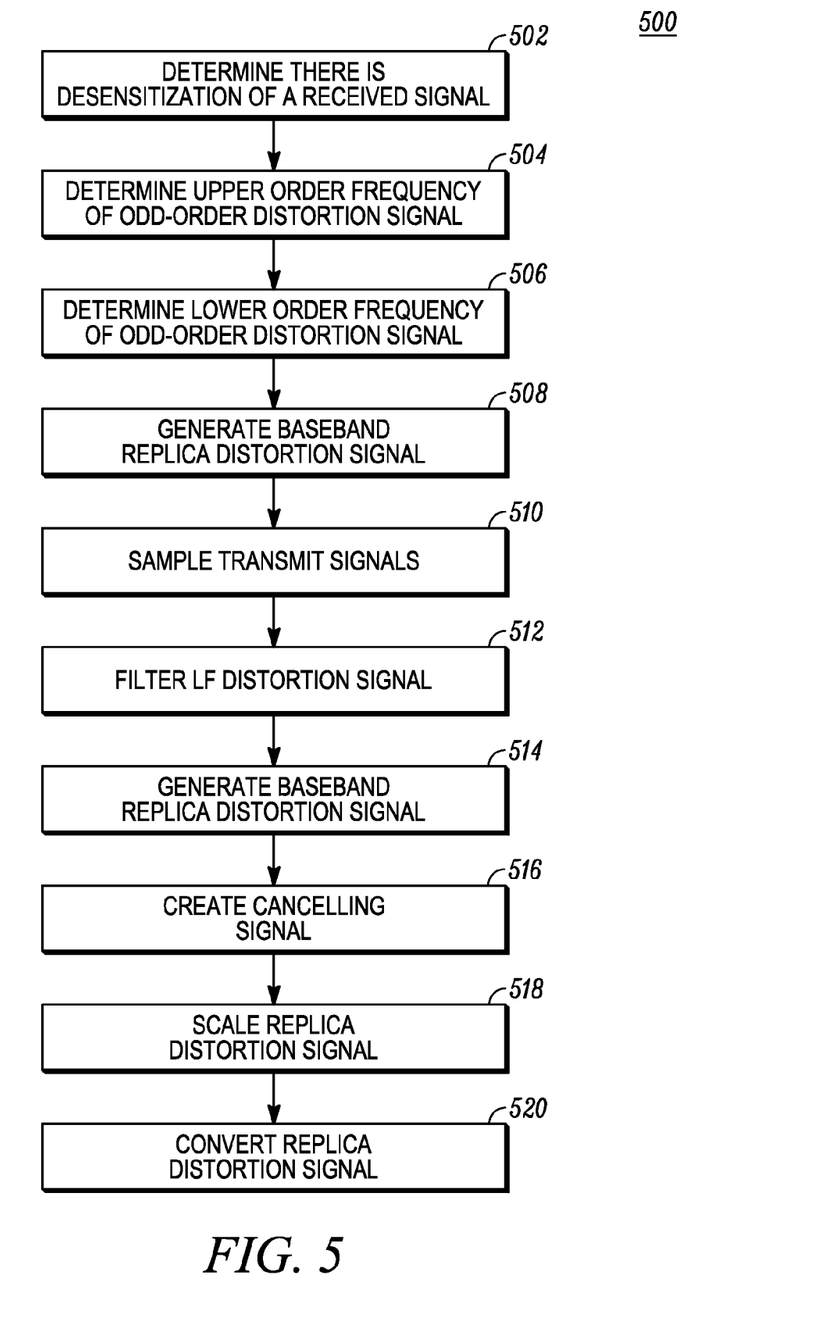
FIG. 5 is an example flowchart illustrating the operation of the wireless communication device that cancels the odd-order distortion signals according to a possible embodiment.

FIG. 5 is an example flowchart 500 illustrating the operation of the WCD 102 that cancels the odd-order distortion signals according to a possible embodiment. The method begins by determining 502 that there is desensitization in a received signal. The desensitization can be caused by odd-order intermodulation or harmonic distortion occurring from a plurality of transmitters 202, 204 that transmit the transmit signals from the WCD 102. As is understood, the odd-order intermodulation distortion signals includes upper order and lower order distortion signals and wherein the upper order and lower order distortion signals are determined based on the frequencies of the transmit signals. Harmonic distortion signals are determined based on the frequency of one of the transmit signals. The upper order frequency of the odd-order intermodulation distortion signals is determined 504 by a function subtracting a higher frequency of the transmit signals form the lower frequency of the transmit signals. In addition, the lower order frequency of the odd-order intermodulation distortion signal is determined 506 by a function subtracting a lower frequency of the transmit signal from the higher frequency of the transmit signals. The harmonic frequency is determined by a function providing a multiple of one of the transmit signals.

In order to remove the odd-order distortion signals, the method generates 508 a baseband replica distortion signal using the transmit signals. In an embodiment, the generated baseband replica distortion signal is determined by sampling 510 the transmit signals near the Nyquist limit of the transmit signals to avoid aliasing. The sampling can be performed prior to calculating the distortion signals. In addition, the method converts 520 the baseband replica distortion signal to a low frequency distortion signal. In an embodiment, the method includes filtering 512 the low frequency distortion signal from the received signal using a low pass filter wherein the low pass filter has a function similar to a low pass filter of a receiver receiving the received signal. In an embodiment, the method includes determining a lower order demodulation signal using a function of the upper frequency signal multiplied by a function of the lower frequency signal and determining an upper order demodulation signal using a function of the lower frequency signal multiplied by a function of the upper frequency signal. Determining the baseband replica harmonic distortion signal includes determining the signal using a function providing an algebraic power of one of the transmit signals.

The method can generate 514 the baseband distortion signal. The method can use interpolated complex signals to generate the baseband replica distortion signals. Moreover, the method can use complex multiplication of the transmit signals to generate the baseband replica distortion signals. In addition, the method can use the frequency separation of the transmit signals to generate the baseband replica distortion signals. The method then subtracts 516 the low frequency distortion signal from the received signal to create a cancelling signal used to cancel the odd-order distortion from the received signal. In an embodiment, the method scales 518 the generated replica distortion signals according to an expected distortion level using a function of a power level of the transmit signals and a gain of a receiver. Moreover, the method includes using 520 complex multiplication on the baseband distortion signal and a clock signal having a frequency of a desired frequency to convert the baseband replica distortion signal to a low frequency replica distortion signal.

Figure 6:
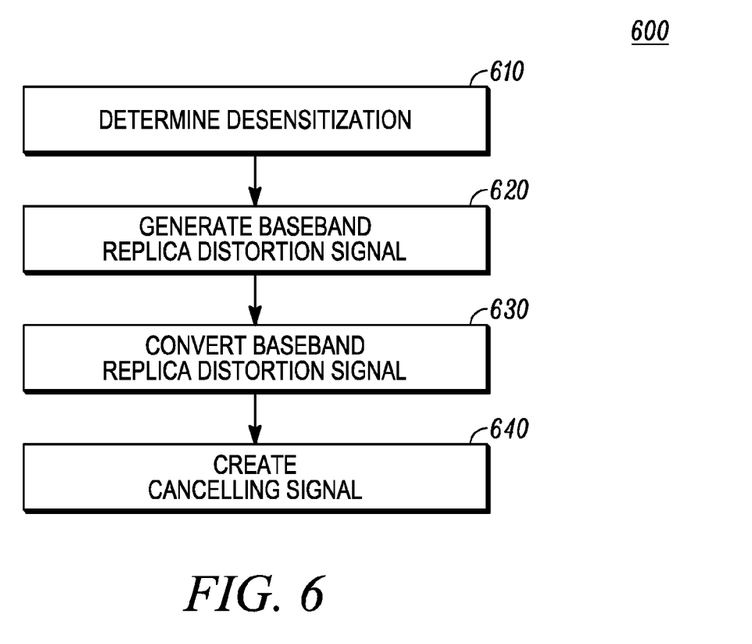
FIG. 6 is an example flowchart illustrating the operation of the wireless communication device that cancels the odd-order distortion signals according to a related embodiment.

FIG. 6 is an example flowchart 600 illustrating the operation of the WCD 102 that cancels the odd-order distortion signals according to a related embodiment. Elements of the flowchart 600 can be combined with or replace elements of the flowchart 500. At 610, desensitization can be determined in a received signal caused by odd-order harmonic distortion occurring from at least one transmit signal. The odd-order harmonic distortion is determined based on the frequency of one of the at least one transmit signals. For example, a harmonic frequency of the odd-order harmonic distortion is determined by a function of a multiple of the at least one transmit signals. At 620, a baseband replica harmonic distortion signal can be generated using the transmit signal. The baseband replica harmonic distortion signal can be generated using interpolated complex signals, using complex multiplication of the transmit signals, using the frequency separation of the transmit signals, or otherwise generated. The baseband replica harmonic distortion signal can be generated by determining a demodulation signal using a power function of the at least one transmit signal. A low frequency of the baseband replica harmonic distortion signal is centered on direct current. At 630, the baseband replica harmonic distortion signal can be converted to a low frequency harmonic distortion signal. At 640, the low frequency harmonic distortion signal can be subtracted from the received signal to create a corrected signal, to cancel the odd-order harmonic distortion from the received signal.

Figure 7:
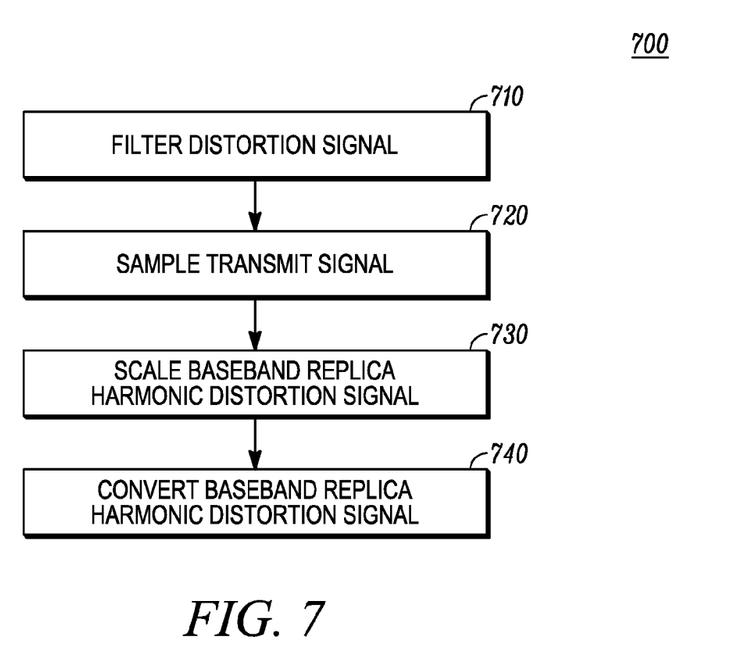
FIG. 7 is an example flowchart illustrating the operation of the wireless communication device that cancels the odd-order distortion signals according to a related embodiment.

FIG. 7 is an example flowchart 700 illustrating the operation of the WCD 102 that cancels the odd-order distortion signals according to a related embodiment. Elements of the flowchart 700 can be combined with the flowchart 600. At 710, the low frequency distortion signal can be filtered from the received signal using a low pass filter where the low pass filter has a function similar to a low pass filter of a receiver receiving the received signal. At 720, the transmit signal can be sampled near a Nyquist limit of the transmit signal to avoid aliasing where the sampling is performed prior to generating the baseband replica harmonic distortion signal. At 730, the generated baseband replica harmonic distortion signal can be scaled according to an expected distortion level using a function of a power level of the transmit signal and a gain of a receiver. At 740, the baseband replica harmonic distortion signal can be converted to a low frequency replica harmonic distortion signal using complex multiplication on the baseband harmonic distortion signal and a clock signal having a frequency of a desired frequency.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
   receiving a received signal that is associated with odd-order intermodulation distortion occurring from at least two transmit signals;
   generating a baseband replica intermodulation distortion signal using the transmit signals;
   converting the baseband replica intermodulation distortion signal to a low frequency intermodulation distortion signal using complex multiplication on the baseband replica intermodulation distortion signal and a clock signal having a frequency of a desired frequency; and
   subtracting the low frequency intermodulation distortion signal from the received signal to cancel odd-order intermodulation distortion from the received signal to create a corrected signal.

2. The method of claim 1 further comprising filtering the low frequency distortion signal using a low pass filter where the low pass filter has a function similar to a low pass filter of a receiver receiving the received signal.

3. The method of claim 1,
   wherein the odd-order intermodulation distortion includes at least one of an upper order distortion signal and a lower order distortion signal, wherein at least one of the upper order distortion signal and the lower order distortion signal is determined based on frequencies of the transmit signals.

4. The method of claim 3, wherein a frequency of the upper order distortion signal is determined by a function subtracting a higher frequency of the transmit signals from a lower frequency of the transmit signals, and a frequency of the lower order distortion signal is determined by a function subtracting the lower frequency of the transmit signal from the higher frequency of the transmit signals.

5. The method of claim 1, further comprising:
   sampling the transmit signals near the Nyquist limit of the transmit signals to avoid aliasing where the sampling is performed prior to generating the baseband replica intermodulation distortion signal.

6. The method of claim 1, wherein generating the baseband replica intermodulation distortion signal comprises generating the baseband replica intermodulation distortion signal using interpolated complex signals.

7. The method of claim 1, wherein generating the baseband replica intermodulation distortion signal comprises generating the baseband replica intermodulation distortion signal using complex multiplication of a direct current baseband replica signal and an intermediate frequency signal having frequency that is a difference between a frequency of a local oscillator and a frequency of the odd-order intermodulation distortion.

8. The method of claim 1, wherein generating the baseband replica intermodulation distortion signal comprises generating the baseband replica intermodulation distortion signal using a frequency separation of the transmit signals.

9. The method of claim 1 wherein generating the baseband replica intermodulation distortion signal comprises determining one of a lower order demodulation signal using a function of an upper frequency intermodulation distortion signal multiplied by a function of a lower frequency intermodulation distortion signal, and an upper order demodulation signal using a function of the lower frequency intermodulation distortion signal multiplied by a function of the upper frequency intermodulation distortion signal.

10. The method of claim 1 further comprising scaling the generated baseband replica intermodulation distortion signal according to an expected distortion level using a function of a power level of the transmit signals and a gain of a receiver that receives the received signal.

11. The method of claim 1 wherein a low frequency of the baseband replica intermodulation distortion signal is centered on direct current.

12. An apparatus comprising:
    a first receiver that receives a received signal;
    a first transmitter that sends transmit signals, wherein the first transmitter causes odd-order distortion of the received signal; and
    an adaptive baseband distortion canceller coupled between the first receiver and the first transmitter, wherein the adaptive baseband distortion canceller generates a baseband replica distortion signal using the transmit signals sent by the first transmitter, converts the baseband replica distortion signal to a low frequency distortion signal, and subtracts the low frequency distortion signal from the received signal to cancel the odd-order distortion from the received signal to create a corrected signal, wherein the adaptive baseband distortion canceller comprises a complex digital mixer that performs complex multiplication on the baseband replica distortion signal using a difference of frequencies in the transmit signals.

13. The apparatus of claim 12, wherein the complex digital mixer has an input of a difference between a frequency of a local oscillator and a frequency of the odd-order distortion.

14. The apparatus of claim 12, wherein the adaptive intermodulation distortion canceller comprises a baseband distortion calculator.

15. The apparatus of claim 12, wherein the adaptive baseband distortion canceller comprises at least one of a least mean squared adaptive filter and a correlation block.

16. The apparatus of claim 12,
    wherein the first transmitter sends first transmit signals,
    wherein the apparatus further comprises a second transmitter that sends second transmit signals, and
    wherein transmitting both the first transmit signals and the second transmit signals causes odd-order distortion of the received signal.

17. The apparatus of claim 12, further comprising a second receiver,
    wherein the first transmitter causes odd-order distortion of the received signal by causing desensitization of a receive channel frequency when transmitting on a frequency related to a frequency of the received signal.

18. The apparatus of claim 17, wherein the frequency related to the frequency of the received signal is a harmonic frequency of a frequency of the transmit signals.

19. The apparatus of claim 17, wherein the apparatus further comprises a second transmitter that sends second transmit signals, and wherein the frequency related to the frequency of the received signal is an intermodulation frequency of a frequency of the transmit signals and a frequency of the second transmit signals.

20. A method comprising:
receiving a received signal that is associated with odd-order harmonic distortion occurring from at least one transmit signal;
generating a baseband replica harmonic distortion signal using the transmit signal;
converting the baseband replica harmonic distortion signal to a low frequency harmonic distortion signal using complex multiplication on the baseband replica harmonic distortion signal and a clock signal having a frequency of a down-converted odd order harmonic signal; and
subtracting the low frequency harmonic distortion signal from a downconverted received signal to cancel the odd-order harmonic distortion from the downconverted received signal to create a corrected signal.

21. The method of claim 20, further comprising filtering the downconverted received signal using a low pass filter, wherein the low pass filter has a function similar to a low pass filter of a receiver receiving the received signal.

22. The method of claim 20, wherein the odd-order harmonic distortion is determined based on the frequency of the at least one transmit signal.

23. The method of claim 22, wherein a harmonic frequency of the odd-order harmonic distortion is determined by a function of a multiple of the at least one transmit signal.

24. The method of claim 20, further comprising sampling the transmit signal near the Nyquist limit of the transmit signal to avoid aliasing, wherein the sampling is performed prior to generating the baseband replica harmonic distortion signal.

25. The method of claim 20, wherein generating the baseband replica harmonic distortion signal comprises generating the baseband replica harmonic distortion signal using interpolated complex signals.

26. The method of claim 20, wherein generating the baseband replica harmonic distortion signal comprises generating the baseband replica harmonic distortion signal using complex multiplication of a direct current baseband replica signal and an intermediate frequency signal having a frequency that is a difference between a frequency of a local oscillator and a frequency of the odd-order harmonic distortion.

27. The method of claim 20, wherein generating the baseband replica harmonic distortion signal comprises generating the baseband replica harmonic distortion signal using frequency separation of at least two transmit signals.

28. The method of claim 20, wherein generating the baseband replica harmonic distortion signal includes determining a demodulation signal using a power function of the at least one transmit signal.

29. The method of claim 20 further comprising scaling the generated baseband replica harmonic distortion signal according to an expected distortion level using a function of a power level of the at least one transmit signal and a gain of a receiver that receives the received signal.

30. The method of claim 20, wherein a low frequency of the baseband replica harmonic distortion signal is centered on direct current.

* * * * *